United States Patent [19]

Coley et al.

[11] 4,082,396
[45] Apr. 4, 1978

[54] SHIELD FOR BUS BAR STABS

[75] Inventors: Kenneth R. Coley, Fairfield; George M. Carris, Monroe, both of Conn.

[73] Assignee: Westinghouse Electric Corporation, Pittsburgh, Pa.

[21] Appl. No.: 773,096

[22] Filed: Feb. 28, 1977

[51] Int. Cl.² ............................................. H01R 13/44
[52] U.S. Cl. .................................... 339/36; 206/332; 339/198 J; 339/DIG. 1
[58] Field of Search ............... 339/21 R, 22 B, 36, 339/198 J, 198 N, DIG. 1; 206/328, 330, 332, 471; 361/359

[56] References Cited

U.S. PATENT DOCUMENTS

| 3,140,778 | 7/1964 | Kaplan | 206/471 |
| 3,356,907 | 12/1967 | Bragulat | 361/359 |
| 3,528,049 | 9/1970 | Orr | 339/36 |
| 3,560,632 | 2/1971 | Wallace | 339/36 |
| 4,003,619 | 1/1977 | Smith | 339/DIG. 1 |

Primary Examiner—Mark S. Bicks
Attorney, Agent, or Firm—L. P. Johns

[57] ABSTRACT

A shield for avoiding the accumulation of contaminants and dust on stabs of loadcenter bus bars during handling and shipping characterized by a molded sheet-like member having spaced blisters extending from one side of the member, and the blisters being comprised of a semi-rigid material adapted to cover the bus bar and stabs detachably clampingly engaged in place.

7 Claims, 4 Drawing Figures

SHIELD FOR BUS BAR STABS

BACKGROUND OF THE INVENTION

1. Field of the Invention

This invention relates to a shield for stabs of a bus bar and, more particularly, it pertains to a cover for bus bars and stabs during shipping and handling and prior to being mounted for use.

2. Description of the Prior Art

Heretofore no effective device has been provided economically for protecting electrical stabs on bus bars prior to their installation in a loadcenter. It has been found that the integrity of the electrical connection between unprotected stabs and circuit breakers subsequently attached thereto is reduced by the accumulation of contaminants, such as dust, paint, and the like. Such contamination normally occurs during handling and installation of the loadcenter prior to the installation of circuit breakers. Accordingly, there is a problem of field failures of circuit breakers and loadcenter stabs due to poor electrical contact between them due to contamination of the stabs.

SUMMARY OF THE INVENTION

In accordance with this invention it has been found that the foregoing problem may be overcome by providing a shield for stabs of bus bars of a loadcenter, comprising a molded sheet-like member having spaced blisters extending from one side thereof, the member being comprised of a semi-rigid material, the blisters having spacings substantially equal to the spacings between the stabs of a loadcenter, each blister having dimensions sufficient to enclose a corresponding stab, the end portion of each blister having a reduced cross-section detachably clampingly engaging one stab, whereby a member is retained in place.

The advantage of the device of this invention is that it provides an inexpensive protection for electrical contacts from paint, dirt, and other types of contaminants, particularly after mounting and before the circuit breakers are installed, whereby failures on circuit breakers and loadcenter stabs due to contamination of the stab are eliminated.

DESCRIPTION OF THE PREFERRED EMBODIMENT

Figure 2:
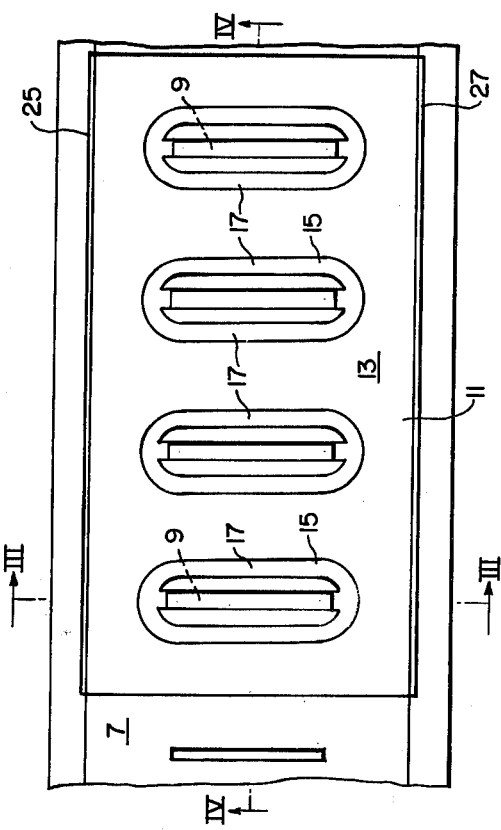
FIG. 2 is a plan view of a portion of a bus bar having spaced stabs covered by a stab protector.
Figure 1:
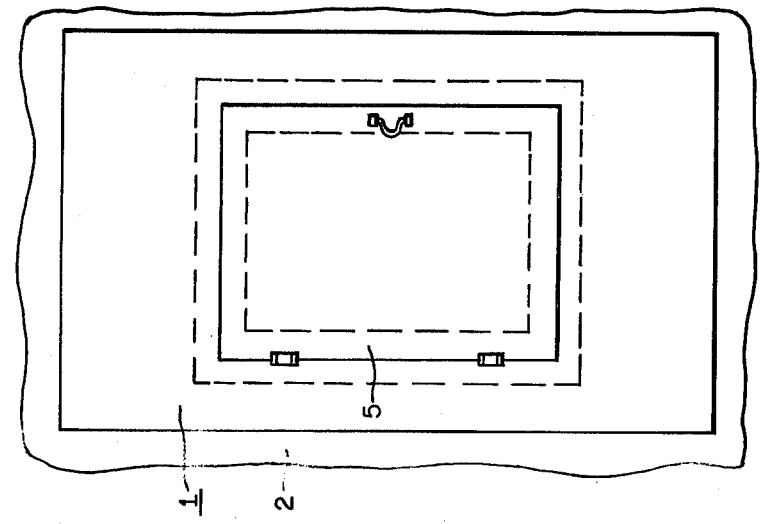
FIG. 1 is a plan view of a flush-mounted panelboard-structure in accordance with this invention.

In FIG. 1 a panelboard or loadcenter structure 1 is supported in a wall 2 of a building. The loadcenter structure 1 comprises a sheet metal enclosure which includes a bottom wall 3 (FIG. 2) and an access door 5. The panelboard 1 encloses a bus bar 7 having a plurality of spaced upright stabs 9 extending therefrom on one side thereof. The panelboard 1 is generally similar in construction and operation to that shown in U.S. Pat. No. 3,356,907 entitled "Panelboard Structure With Adjustable Shield" issued on Dec. 5, 1967, to J. J. Brogulot and assigned to Westinghouse Electric Corporation, and is incorporated as part hereof. In addition, a shield, cover, or protector 11 is mounted on the bus bar 7 and particularly over the several stabs 9 to protect the stabs during handling and shipment from the accumulation of contaminating matters, such as dust, paint, and the like.

The panelboard 1 is a base preferably composed of an electrically insulating material on which the bus bar 7 is mounted. The bus bar is a metal member, such as copper, from which the several stabs 9 extend at equally spaced intervals on one side thereof. The stabs 9 are an integral part of the bus bar 7 and are so spaced as to provide for the connection of circuit breakers (not shown) in a conventional manner.

In accordance with this invention, the shield 11 is a relatively thin member having a thickness of 0.007 to 0.012 inch. It is comprised of a resinous material, such as polyvinylchloride or polystyrene, which is formed by vacuum molding the material over a die into the desired form. That form comprises a sheet-like base 13 and a plurality of upwardly extending projections or blisters 15 disposed to cover the several spaced stabs 9. The shield 11 is semi-rigid and slightly flexible to enable yielding conformity with the overall shape of the bus bar and stabs.

Figure 4:
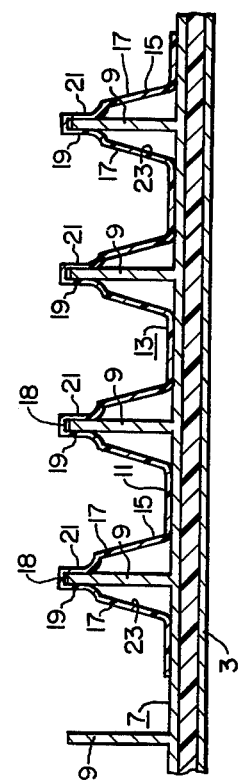
FIG. 4 is a vertical sectional view taken on the line III—III of FIG. 2.
Figure 3:
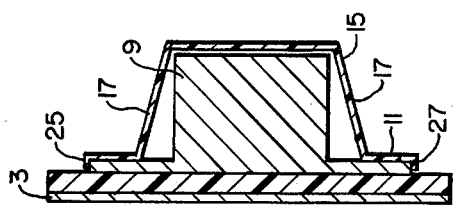
FIG. 3 is an end view of the assembly of FIG. 2.

As shown in FIGS. 3 and 4, each blister 15 comprises a flared portion or tapered walls 17 adjacent to the base 13 as well as a cup-shaped portion at the apex of the tapered walls 17 and formed by opposite side walls 19, 21. The side walls 19, 21 and the flared portions 17 are integral with the base 13 and form small chambers into which the stabs 9 project. Thus, the stabs are completely enclosed by the shield 11 to avoid the collection of contaminants, such as dirt, which reduce the integrity of the electrical contact between the stabs and the circuit breakers.

The shield 11 is also provided with means for retaining the shield in place on the stabs 9 and bus bar 7. When the shield 11 is brought into position over the stabs 9, the tapered portion 17 guides the stabs into the cup-shaped portion 18, having lateral dimensions less than the stab thickness, formed by the side walls 19, 21 which side walls are expanded outwardly to accommodate the upper end portion of each stab 9. Thus, each cup-shaped portion 18 formed by the side walls 19, 21 detachably and clampingly engages a corresponding stab 9 to hold the shield 11 in place as shown.

Another means for retaining the shield 11 in place, as an alternative or in addition to the clamping engagement formed at the upper end of each stab 9, is to provide for a spacing between at least two pairs of blisters which is slightly greater or less than the spacing between a pair of the stabs 9, whereby the blisters 15 move slightly out of their detached positions to accommodate and receive the stabs 9 as the shield 11 is moved into the attached position. Thus, a slight bind is applied to the overall assembly of each shield 11 in order to hold the shield in place.

Still another means for retaining the shield 11 in place which may be used in addition or as an alternative to the cup-shaped configuration formed by the side walls 19, 21 is to provide a pair of side flanges 25, 27 (FIGS. 2, 3) which flanges fit tightly along the opposite sides of the bus bar 7 to retain the shield in place. It is noted however, that the side walls 19, 21 are sufficient to normally retain the shield in place.

In conclusion, the device of this invention provides protection from contamination of electrical stabs on a bus bar of a loadcenter which contamination normally occurs during installation of a loadcenter and prior to installation of circuit brakers. The device helps to eliminate field failures of circuit breakers in loadcenter stabs due to the contamination which causes poor electrical contact between the circuit breaker and the loadcenter stab.

We claim:

1. A shield for stabs of a loadcenter bus bar comprising a formed sheet-like member having spaced blisters extending from one side of the member, the blisters having spacings approximately equal to the spacing between the stabs of a loadcenter, each blister having dimensions sufficient to enclose a corresponding stab, and retaining means for retaining the member in place on the bus bar and stabs and comprising a blister end portion having a reduced cross section detachably clamplingly engaging an outer end portion of the stab.

2. The shield of claim 1 in which the blister end portion has an unexpanded dimension slightly less than that of the stab.

3. The shield of claim 2 in which the smaller dimension of the blister end portion is less than that of the stab.

4. The shield of claim 1 in which the portion of each blister adjacent to the sheet-like member is flared outwardly.

5. A loadcenter structure comprising an enclosure, an elongated bus bar in the enclosure, the bus bar comprising an elongated body portion and a plurality of stabs extending from the body portion in a longitudinally spaced relationship, a formed sheet-like shield having spaced blisters extending from one side of the shield, the blisters having spacings approximately equal to the spacing between the stabs of a loadcenter, each blister enclosing a corresponding stab, and retaining means for retaining the shield in place on the bus bar and stabs and comprising spaced flexible wall portions deformable from an undistorted to a distorted configuration when the shield is in place on the bus bar and stabs.

6. The loadcenter structure of claim 5 in which the formed sheet-like shield is comprised of a semi-rigid material, and retaining means comprising spaced portions of the shield being yieldingly conformable with the bus bar.

7. The loadcenter structure of claim 6 in which the retaining means comprises a blister end portion having an expandable structure clampingly engaging the outer end portion of the stab.

* * * * *